(12) United States Patent
Morimoto et al.

(10) Patent No.: US 6,504,883 B1
(45) Date of Patent: Jan. 7, 2003

(54) SYNCHRONOUS DETECTOR

(75) Inventors: Kunio Morimoto, Tokyo (JP);
Yasufumi Okamoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/438,482

(22) Filed: Nov. 12, 1999

(30) Foreign Application Priority Data

Nov. 24, 1998 (JP) .......................................... 10-332361

(51) Int. Cl.[7] .............................................. H04L 27/22
(52) U.S. Cl. ........................ 375/343; 375/142; 370/335
(58) Field of Search ................................ 375/343, 142, 375/143, 150, 152, 325; 370/320, 324, 335, 342

(56) References Cited

U.S. PATENT DOCUMENTS 5,832,021 A * 11/1998 Kondo ........................ 375/200
5,881,099 A * 3/1999 Takahashi et al. .......... 375/206

OTHER PUBLICATIONS

"A Development Conditions and Its Technical Issue of Digital Matched Filters in Spread–Spectrum Communication Systems" Hisao Tachika, The Institute of Electronics, Information and Communication Engineers, SST92–21 (1992).

* cited by examiner

Primary Examiner—Lee Nguyen
(74) Attorney, Agent, or Firm—Venable; Robert J. Frank (57) ABSTRACT

A synchronous detector used in a code division multiple access (CDMA) communication receiver comprises a correlator and a pre-synchronous decision circuit. The correlator calculates a plurality of correlation values between a received signal spread with an x-chip sequence of a spread code and n-chip correlation coefficients for different phase timings. The pre-synchronous decision circuit, coupled to the correlator, generates at least one timing control signal indicating a phase timing corresponding to a highest correlation value. The correlator comprises a synchronous estimator that estimates a synchronous phase by calculating the correlation values between the received signal and the n-chip correlation coefficients every cycle of the spread code and by accumulating the correlation values. The synchronous estimator comprises an n-chip correlation coefficient generator that generates the n-chip correlation coefficients at phase timings indicated by a timing control signal.

4 Claims, 8 Drawing Sheets

SYNCHRONOUS DETECTOR

BACKGROUND OF THE INVENTION

1. Field of the Invention

This invention relates generally to a mobile radio communication apparatus, and more specifically, it relates to a synchronous detector used in a code division multiple access (CDMA) radio communication receiver.

2. Description of the Background Art

A synchronous detector used in a code division multiple access (CDMA) receiver, for example, is described in a paper entitled "A Development Conditions and Its Technical Issue of Digital Matched Filters in Spread-Spectrum Communication Systems," Hisao Tachika, The Institute of Electronics, Information and Communication Engineers, SST92-21 (1992). In the CDMA receiver, transmission data is spread and de-spread by using the same pseudo-noise (PN) code between a transmitting station and a receiving station as a spread code. The PN code is a bit sequence consisting of logical values [+1] or [−1]. A time interval between two bits is referred to as a chip. A correlation value between two PN codes is obtained by multiplying each bit of the two PN codes for every chip and then summing the results of the multiplication. Consequently, if the phases of the PN codes match, the correlation value becomes large. On the other hand, if the phases of the two PN codes do not match, the correlation value becomes almost zero. When the CDMA receiver receives a radio signal, the CDMA receiver needs to match the phase of the PN code of the radio signal and the phase of a local PN code generated by the CDMA receiver in order to spread-spectrum demodulate the radio signal. Matching the phases of the two PN codes is referred to as synchronous acquisition.

The radio signal received at an antenna is demodulated to baseband signals consisting of an inphase baseband signal (I signal) and a quadrature baseband signal (Q signal) by multiplying, respectively, an inphase oscillation signal and a quadrature oscillation signal generated by a local oscillator.

To acquire synchronization of the radio signal, first, an inphase correlation value is calculated by multiplying each bit of the PN code of the inphase baseband signal with each bit of the local PN code and then summing the results of the multiplication. Second, a quadrature correlation value is determined in a similar way. To obtain a correlation power of the received signal, the inphase correlation value and the quadrature correlation value are each squared and then the squared results are added to each other.

The calculations of the correlation power are performed to all phases of the PN code of the radio signal by shifting 1 chip or ½ chip or ⅓ chip to detect at least one synchronous phase (or synchronous timing). Accordingly, the synchronous phase of the PN code of the radio signal to the local PN code can be acquired based on detecting the timing having the highest correlation power or the timing having a higher correlation power greater than a predetermined threshold. In general, a digital matched filter performs the calculations described above. That is, the digital matched filter calculates the correlation powers to all phases of the received signal by shifting 1 chip or ½ chip or ⅓ chip. Thus, at least one synchronous phase having the highest correlation power or the higher correlation power beyond a predetermined threshold can be detected.

In a conventional CDMA communication system, a pilot signal is used to acquire the synchronization of the received signal. Since the pilot signal is comprised of a predetermined bit sequence, e.g., all bits are logical value [+1] or [−1], the pilot signal is a PN code that does not modulate. Thus, it is possible for the CDMA receiver to calculate the correlation power at ½ chip rate or ⅓ chip rate to obtain a higher correlation power rather than that of 1 chip rate.

The digital matched filter stores the received signal corresponding to the number of the chip in corresponding registers, and multiplies each bit of the received signal with each bit of the local PN code for every chip. When the next bit of the radio signal is input, each bit stored in the register is shifted, and the next correlation power of the received signal is calculated. To calculate the correlation power at less than one chip rate (e.g., ½ chip rate or ⅓ chip rate), the number of the registers corresponding to the selected rate is required.

As can be seen, the calculations for acquiring the synchronization of the received signal become numerous based on the length of the PN code and chip rate. For example, suppose that the PN code is comprised of 128 bits, and that the correlation power is calculated every one chip. The digital matched filter must perform 256 multiplying calculations (128 calculations for the I signal and 128 calculations for the Q signal), 256 squaring calculations for squaring the results of each multiplying calculation, and summing calculations for summing the results of the squaring calculations at the one chip rate.

Furthermore, since accuracy in acquiring the synchronization is reduced under noisy conditions, the chip rate of less than one chip is necessary. Suppose that the PN code is comprised of 128 bits, and that the correlation power is calculated every 1/10 chip. The digital matched filter must perform 2560 multiplying calculations and needs 2560 registers and 2560 multipliers. Thus, the size of the digital matched filter becomes larger as faster calculations are required.

SUMMARY OF THE INVENTION

It is an object of the present invention to provide an improved small synchronous detector for acquiring the synchronization of a radio signal speedily and correctly.

It is a further object of the present invention to avoid large digital matched filters when fast calculations are required.

To accomplish these objectives, a synchronous detector used in a CDMA communication receiver comprises a correlator, a pre-synchronous decision circuit, an n-chip correlation coefficient generator and a synchronous estimator. The correlator calculates a plurality of correlation values between a received signal spreading with an x-chip sequence of a spread code and an n-chip correlation coefficient at different phase timing, where x and n are positive integers and n is smaller than x. The pre-synchronous decision circuit, coupled to the correlator, generates at least one timing control signal indicating phase timing corresponding the highest correlation value. The n-chip correlation coefficient generator generates the n-chip correlation coefficient at the phase timing indicated by the timing control signal. The synchronous estimator estimates a synchronous phase by calculating correlation values between the received signal and the n-chip correlation coefficient generated by the n-chip correlation coefficient generator every cycle of the spread code and by accumulating the correlation values.

BRIEF DESCRIPTION OF THE DRAWINGS

These and other objects and features of the present invention will become more apparent from consideration of the following detailed description taken in conjunction with the accompanying drawings in which.

DESCRIPTION OF THE PREFERRED EMBODIMENTS

First Embodiment of the Invention

Figure 1:
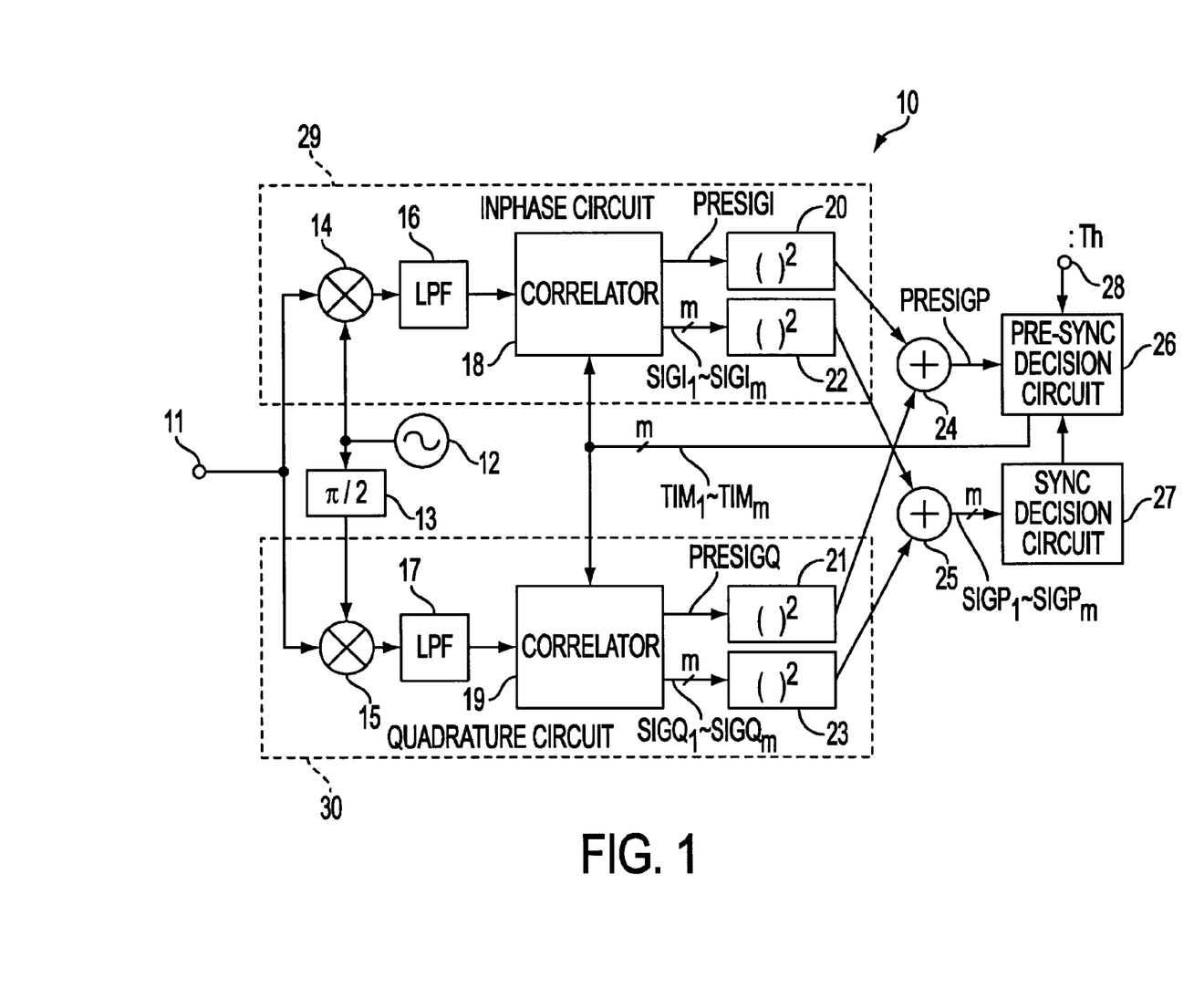
FIG. 1 is a block diagram showing a synchronous detector according to a first embodiment of the invention.

FIG. 1 shows a synchronous detector 10 according to a first embodiment of the invention. The synchronous detector 10 includes an input terminal 11, a carrier oscillator 12, a π/2 phase shifter 13, frequency mixers 14 and 15, low pass filters 16 and 17, correlators 18 and 19, squaring circuits 20, 21, 22 and 23, adders 24 and 25, a pre-synchronous decision circuit 26, a synchronous decision circuit 27, and a threshold input terminal 28.

An inphase circuit 29 is composed of the frequency mixer 14, the low pass filter 16, the correlator 18 and the squaring circuits 20 and 22. A quadrature circuit 30 is composed of the frequency mixer 15, the low pass filter 17, the correlator 19 and the squaring circuits 21 and 23.

A received signal is received at an antenna (not shown) and is provided to the input terminal 11. The carrier oscillator 12 generates a local carrier to convert the received signal to a baseband signal. The π/2 phase shifter 13 shifts the phase of the local carrier by 90 degrees. The frequency mixer 14 multiplies the local carrier generated by the carrier oscillator 12 and the received signal. The frequency mixer 15 multiplies the π/2 shifted local carrier outputted by the π/2 phase shifter 13 and the received signal. The low pass filters 16 and 17 remove frequency bandwidth above a bandwidth threshold from the signals output by the frequency mixers 15 and 16, respectively Consequently, the received signal input to the input terminal 11 is converted to an inphase baseband signal by the frequency mixer 14 and low pass filter 16 and is converted to a quadrature baseband signal by the frequency mixer 15 and low pass filter 17. The correlator 18 performs correlation operations to estimate a synchronous phase of the inphase baseband signal. Specifically, the correlator 18 outputs at least one provisional correlation value to the pre-synchronous decision circuit 26 for pre-synchronous decision and outputs to the synchronous decision circuit 27 m correlation values ($SIGI_1$–$SIGI_m$) calculated based on timing control signals ($TIM_3$–$TIM_m$) corresponding to the at least one provisional correlation value.

The correlator 19 similarly performs correlation operations to estimate a synchronous phase of the quadrature baseband signal. Specifically, the correlator 19 outputs at least one provisional correlation value to the pre-synchronous decision circuit 26 for pre-synchronous decision and outputs to the synchronous decision circuit 27 m correlation values ($SIGQ_1$–$SIGQ_m$) calculated based on timing control signals ($TIM_1$–$TIM_m$) corresponding to the at least one provisional correlation value.

The squaring circuit 20 squares the provisional correlation value calculated by the correlator 18, and the squaring circuit 21 squares the provisional correlation value calculated by the correlator 19. The adder 24 adds the squared provisional correlation value output by the squaring circuit 20 with the squared provisional correlation value output by the squaring circuit 21. The addition result is provided to the pre-synchronous decision circuit 26 as the provisional correlation power (PRESIGP) of the received signal.

The pre-synchronous decision circuit 26 provisionally decides the synchronous phase of the received signal based on the correlation power (PRESIGP), a threshold (Th) input at the threshold input terminal 28 and a correlation result calculated by the synchronous decision circuit 27 as discussed below with reference to FIG. 3. The results of the synchronous phase are provided to the correlator 18 and the correlator 19 as timing control signal $TIM_1$–$TIM_m$.

The squaring circuit 22, which is composed of m squaring circuits (where m is a positive integer), respectively squares the m correlation values ($SIGI_1$–$SIGI_m$) output by the correlator 18 and the squaring circuit 23 also respectively squares the m correlation values ($SIGQ_1$–$SIGQ_m$) outputted by the correlator 19.

The adder 25, which is composed of m adders, adds the squared correlation values ($SIGI_1$–$SIGI_m$) output by the squaring circuit 22 and the squared correlation values ($SIGQ_1$–$SIGQ_m$) output by the squaring circuit 23. The added correlation values ($SIGP_1$–$SIGP_m$) are provided from the adder 25 to the synchronous decision circuit 27.

The synchronous decision circuit 27 estimates at least one synchronous phase having the highest correlation power or higher correlation power more than a predetermined threshold. The result of the synchronous phase estimated by the synchronous decision circuit 27 is provided to the pre-decision circuit 26.

The correlator 18 is next explained in detail with reference to FIG. 2. The correlator 18 is functionally divided into a digital matched filter 101 having n coefficient terminals $103_1$–$103_n$ and a synchronous estimator 122.

The digital matched filter 101 has a data input terminal 102 for receiving the baseband signal from the low pass filter 16, coefficient terminals $103_1$–$103_n$ for receiving coefficients $k_1$–$k_n$, D-type flip-flops (DFF) $104_1$–$104_n$, D-type flip-flops $105_1$–$105_n$, multipliers $106_1$–$106_n$, an adder 107, a D-type flip-flop 108 and output terminal 109.

The coefficient terminals $103_1$–$103_n$ are respectively connected to the DFF $105_1$–$105_n$ to provide coefficients $k_1$–$k_n$. The DFF $104_1$–$104_n$ are connected to each other in series to function as a shift register, and the DFF $104_1$ is also connected to the data input terminal 102. The multipliers $106_1$–$106_n$ are respectively connected to the DFF $104_1$–$104_n$ and the DFF $105_1$–$105_n$. That is, the outputs of the OFF $104_1$ and the DFF $105_1$ are provided to the multiplier $106_1$, and the outputs of the DFF $104_2$ and the DFF $105_2$ are provided to the multiplier $106_2$. Similarly the outputs of the DFF $104_n$ and the DFF $105_n$ are provided to the multiplier $106_n$. The adder 107 sums the multiplied results from the multipliers $106_1$–$106_n$ and outputs the summed result to the DFF 108.

The coefficients $k_1$–$k_n$ are composed of n bits in total and are a part of the PN code sequence used by the transmitting station for spreading the signal to be transmitted. The coefficients $k_1$–$k_n$ are associated with the spread code and are determined between the transmitting station and the receiving station every telecommunication call. The coefficients $k_1$–$k_n$ are generated using coefficient generators (not shown).

Next, the synchronous estimator 122 is explained. The synchronous estimator 122 has input terminals $110_1$–$110_n$, PN pattern generators $111_1$–$111_m$, n-bit shift registers $112_1$–$112_m$, a multiplexer 113, multipliers $114_1$–$114_n$, an adder 115, a demultiplexer 116, accumulators $117_1$–$117_m$, output terminals $120_1$–$120_m$ and a switching terminal 121. The accumulators $117_1$–$117_m$ are respectively comprised of adders $118_1$–$118_m$ and registers $119_1$–$119_m$.

The timing control signal $TIM_1$–$TIM_m$ generated by the pre-synchronous decision circuit 26 is input to the PN pattern generators $111_1$–$111_m$ via the input terminals $110_1$–$110_m$ to control timing for generating PN patterns. The timing control signal $TIM_1$ is input to the PN pattern generators $111_1$ via the input terminal $110_1$, and similarly the timing control signal $TIM_m$ is input to the PN pattern generators $111_m$ via the input terminal $110_m$. The PN pattern generators $111_1$–$111_m$ generate the PN patterns according to the timing control signal $TIM_1$–$TIM_m$ and then output the PN patterns to the n-bit shift registers $112_1$–$112_m$. The PN pattern generators $111_1$–$111_m$ have the same structure and generate the same code sequence as the PN pattern used by the transmitting station. 20 Each of the n-bit shift registers $112_1$–$112_m$ has n registers corresponding to the number of the coefficients $k_1$–$k_n$, where n is a positive integer. The n-bit shift registers $112_1$–$112_M$ convert the serial sequence of the PN patterns to n parallel bits (bit 1 to bit n) and output the parallel bits to the multiplexer 113.

The multiplexer 113 time-division multiplexes the outputs of the n-bit shift registers $112_1$–$112_m$ based on a switching signal input to the switching terminal 121 to the multipliers $114_1$–$114_n$. A controller (not shown) supplies the switching signal as mentioned below with reference to FIG. 4. Each of the multipliers $114_1$–$114_n$ multiplies the n-bit data from the multiplexer 113 with the output of the DFF $104_1$–$104_n$ and outputs the results to the adder 115. The adder 115 sums the outputs of the multipliers $114_1$–$114_n$ and outputs the total to the demultiplexer 116. The demultiplexer 116 time-division de-multiplexes the output of the adder 115 based on the switching signal from terminal 121 and respectively outputs the m output data to the m accumulators $117_1$–$117_m$.

The accumulators $117_1$–$117_m$ are respectively composed of adders $118_1$–$118_m$ and registers $191_1$–$119_m$. Each of the registers $119_1$–$119_m$ has a sufficient number of registers to avoid over-flow. The output of the demultiplexer 116 is provided to an input terminal of each adder $118_1$–$118_m$, and the output of each adder $118_1$–$118_m$ is provided to the input of each register $119_1$–$119_m$, respectively. The outputs of registers $191_1$–$119_m$ are provided to the output terminals $120_1$–$120_m$ respectively, and are fed back as inputs to the adders $118_1$–$118_m$. Hence, the accumulators $117_1$–$117_m$ respectively accumulate n outputs of the demultiplexer 116 and output the correlation values ($SIGI_1$–$SIGI_m$) to the squaring circuit 22 shown in FIG. 1 via the output terminals $120_1$–$120_m$.

Figure 3:
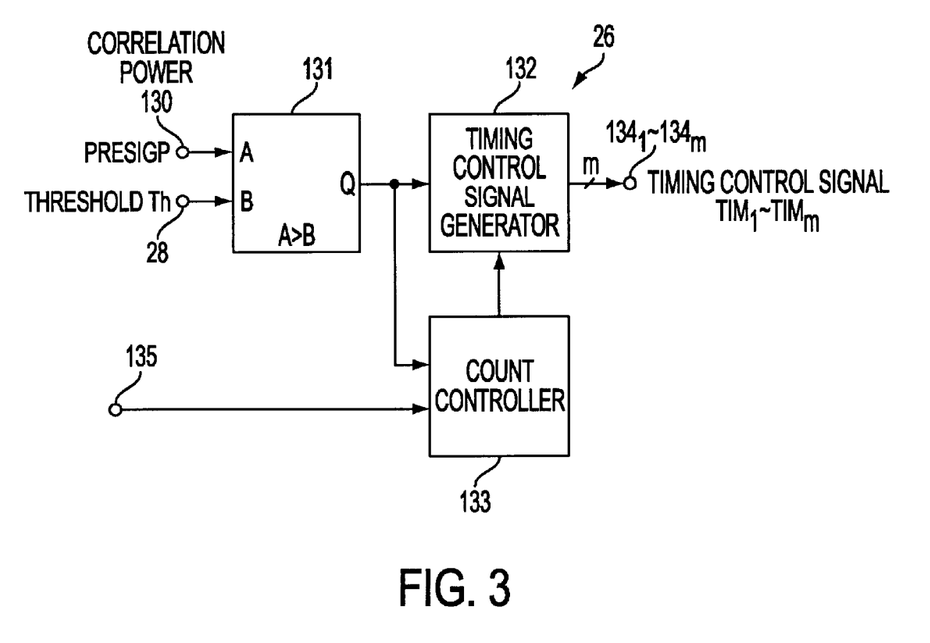
FIG. 3 is a block diagram showing a pre-synchronous decision circuit of the synchronous detector.

FIG. 3 shows the pre-synchronous decision circuit 26 of FIG. 1. The pre-synchronous decision circuit 26 has an input terminal 130, the threshold input terminal 28, a comparator 131, a timing control signal generator 132, a count controller 133, output terminals $134_1$–$134_m$ and an input terminal 135.

The comparator 131 compares the correlation power PRESIGP provided to the input terminal 130 from the adder 24 with threshold Th provided to the threshold input terminal 28 and outputs a pre-synchronous detecting pulse having a logical high level when the correlation power PRESIGP is larger than the threshold Th and a logical low level otherwise. The pre-synchronous detecting pulse is provided to the timing control signal generator 132 as pre-synchronous phase information and is also provided to the count controller 133 as an information signal showing phase information between the PN code of the received signal and the coefficients $k_1$–$k_n$.

The timing control signal generator 132 generates the timing control signals $TIM_1$–$TIM_m$ and feeds the signals $TIM_1$–$TIM_m$ to the correlator 18 and the correlator 19 via the output terminals $134_1$–$134_m$.

The count controller 133 generates a control signal based on the result of the synchronous timing estimated by the synchronous decision circuit 27 via the input terminal 135 and the pre-synchronous detecting pulse from the comparator 131 such that the timing control signal generator 132 generates m or less timing control signals $TIM_1$–$TIM_m$.

The operation of the synchronous detector 10 is now explained with reference to FIG. 1. As shown in FIG. 1, a received signal is supplied to the inphase circuit 29 and the quadrature circuit 30 via the input terminal 11. Here, the operation of the inphase circuit 29 is only explained below because the quadrature circuit 30 performs the same operation as the inphase circuit 29.

In the inphase circuit 29, the received signal is supplied to the frequency mixer 14. By multiplying, at the frequency mixer 14, a carrier signal generated by carrier oscillator 12 with the received signal, the received signal is divided into an inphase baseband signal having an inphase component and a signal having a frequency that is twice as high as that of the carrier signal. This inphase baseband signal is provided to the low pass filter 16. The filtered inphase baseband signal is next provided to the data input terminal 102 of the correlator 18 as shown in FIG. 2.

Figure 2:
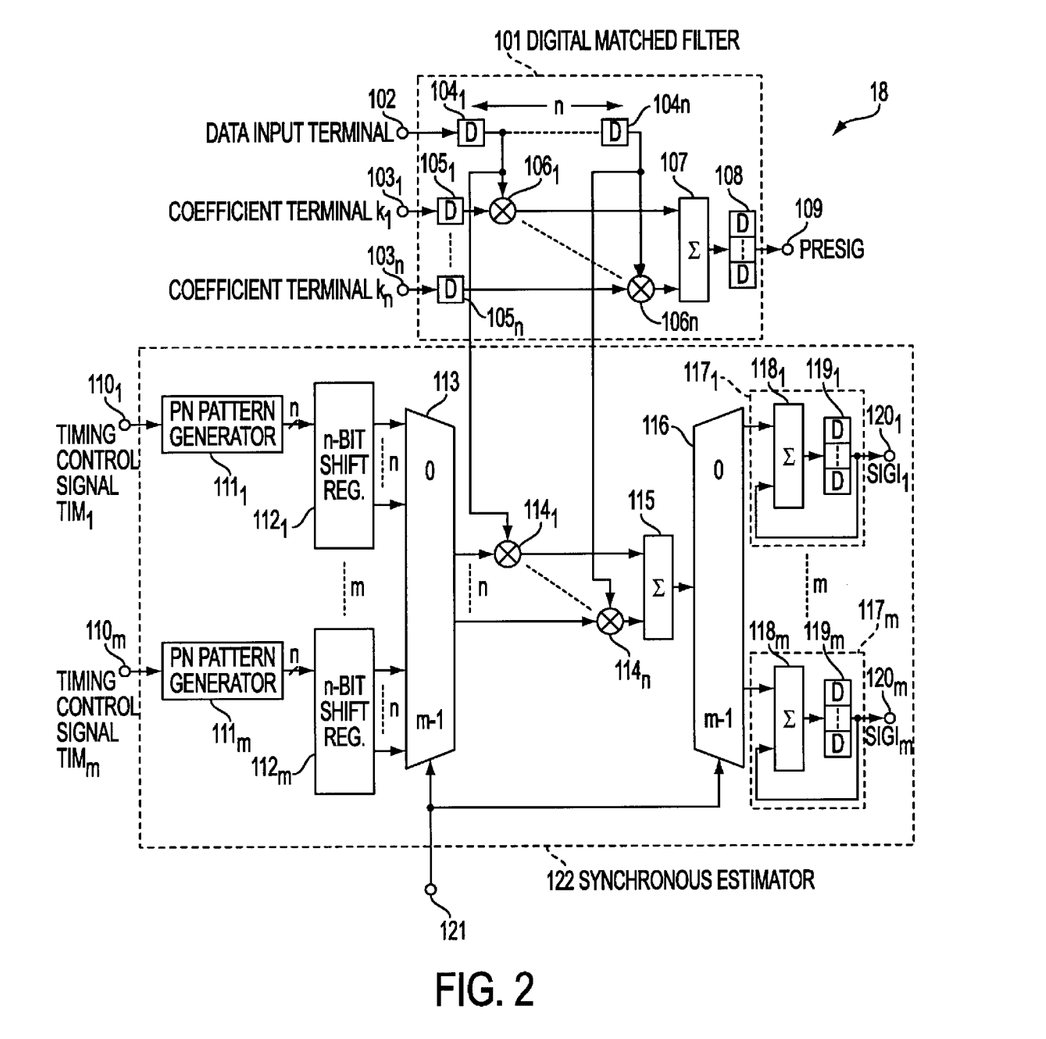
FIG. 2 is a block diagram showing a correlator of the synchronous detector.

In FIG. 2, the inphase baseband signal is input to the DFF $104_1$–$104_n$ every clock timing signal via the input terminal 102. The coefficients $k_1$–$k_m$ are respectively provided to the DFF $105_1$–$105_n$. The multipliers $106_1$–$106_n$ respectively multiply the outputs of the DFF $104_1$–$104_n$ with the outputs of the DFF $105_1$–$105_n$ and then output each result of the multiplication to the adder 107. The adder 107 sums the results of the multiplications. Because the coefficients $k_1$–$k_n$ are held in the DFF $105_1$–$105_n$, a correlation calculation between the inphase baseband signal and the coefficients $k_1$–$k_n$ is performed again when next data bit of the inphase baseband signal is input to the DFF $104_1$–$104_n$ at the next clock timing signal. The previous correlation value PRESIGI summed by the adder 107 is temporarily stored in the DFF 108 and is provided to the squaring circuit 20 as shown in FIG. 1 via the output terminal 109. In FIG. 1, the squaring circuit 20 squares the previous correlation value PRESIGI output by the DFF 108 and outputs the squared previous correlation value PRESIGI to the adder 24 as an inphase correlation power signal.

Simultaneously, the quadrature circuit 30 performs the same operations as the inphase circuit 29. Accordingly, the squaring circuit 21 of the quadrature circuit 30 squares the previous correlation value PRESIGQ output by the correlator 19 and outputs the squared previous correlation value PRESIGQ to the adder 24 as a quadrature correlation power signal.

The adder 24 adds the inphase correlation power signal and the quadrature correlation power signal and outputs a previous correlation power signal PRESIGP to the pre-synchronous decision circuit 26. The previous correlation power signal PRESIGP indicates a correlation power between the received signal input to input terminal 11 and the coefficients $k_1$–$k_n$, and becomes a maximum when the phase of the received signal matches that of the coefficients $k_1$–$k_n$ for the ideal condition in which there is no noise.

If the number of the coefficients $k_1$–$k_n$ is large, the digital matched filter 101 can acquire the synchronization accurately. However, a large number of coefficients $k_1$–$k_n$ increases the number of calculations, and the size of the matched filter 101 must track the number of coefficients $k_1$–$k_n$ for accuracy of the synchronous detection. Thus, for example, if the number of the coefficients $k_1$–$k_n$ is decreased to one-eighth its size to decrease the number of calculations, the size of the digital matched filter 101 also becomes about one-eighth its size. However, the accuracy of the synchronous detection is worsened because of this reduction. Consequently, if the number of the coefficients $k_1$–$k_n$ is decreased to reduce the number of calculations for the synchronous detection, digital matched filter 101 must compensate for the loss in the accuracy of the synchronous detection. To accomplish this, the pre-synchronous decision circuit 26 and the synchronous estimators 122 of the correlators 18 and 19 act to improve the accuracy of the synchronous detection.

The pre-synchronous decision circuit 26 is now explained with reference to FIG. 3. In the pre-synchronous decision circuit 26, the previous correlation power signal PRESIGP output by the adder 24 is provided to the input terminal (A) of the comparator 131 and the threshold Th, which is estimated by general simulations or field tests, is provided to the other input terminal (B) of the comparator 131. The comparator 131 outputs a pre-synchronous detecting pulse having a high-level when the previous correlation power signal PRESIGP exceeds the threshold Th and a low level otherwise. At this point, the phase relationship between the input data of the digital matched filter 101 and the coefficients $k_1$–$k_n$ is called a pre-synchronous phase. The pre-synchronous detecting pulse is provided from the output terminal Q of the comparator 131 to the timing control signal generator 132.

The timing control signal generator 132 controls timing of the output of the pre-synchronous detecting pulse according to a desired timing. The controlled pre-synchronous detecting pulse is output as the timing control signals $TIM_1$–$TIM_m$.

The desired timing of the timing control signal generator is to adjust the time lag such that sequences of the PN code generated by the PN pattern generators $111_1$–$111_m$ are multiplied with sequences of the received signal stored in the DFF $104_1$–$104_n$ at a timing defined as the pre-synchronous phase having the highest correlation value.

The count controller 133 counts the number of the pre-synchronous detecting pulses from the comparator 131 and detects the pre-synchronous phase during a predetermined time period. Also the count controller 133 restricts the number of pre-synchronous detecting pulses such that the number does not exceed a predetermined number m, where m is a positive integer and corresponds to the maximum number of the timing control signals $TIM_1$–$TIM_m$. Thus, the count controller 133 has a restricting algorithm for restricting the number of pre-synchronous detecting pulses to be m or less in the predetermined time period. With the restricting algorithm, for example, when the number of the pre-synchronous detecting pulses exceeds m during the time period, the count controller 133 makes the timing control signal generator 132 not output a further timing control signal $TIM_{m+1}$. Next, the count controller 133 waits for a response from the synchronous decision circuit 27 via input terminal 135. If the response indicates the acquisition of the synchronous detection based on any of the timing control signals $TIM_1$–$TIM_m$ already sent, the count controller 133 restarts the count of the number of the pre-synchronous detecting pulses and begins detecting the pre-synchronous phase for the next predetermined time period. If the response does not indicate the acquisition of the synchronous detection, the count controller 133 masks or nullifies the already counted pre-synchronous detecting pulses and counts them again. The count controller 133 then begins to count the number of pre-synchronous detecting pulses and to detect the pre-synchronous phase for the next predetermined time period.

Since the count controller 133 has the above mentioned restricting algorithm, the pre-synchronous decision circuit 26 can always output the m or less number of the timing control signals $TIM_1$–$TIM_m$. Although these timing control signals $TIM_1$–$TIM_m$ are selected by the correlation value of the digital matched filter 101, it is necessary to estimate the detected pre-synchronous phases because the number of the coefficients $k_1$–$k_n$ is smaller than that of PN sequence. In particular, if a plurality of the timing control signals $TIM_1$–$TIM_m$ are detected, the synchronous estimator 122 needs to determine which timing control signal $TIM_1$–$TIM_m$ has the best correlation value. The synchronous estimator 122 is discussed next.

Figure 4:
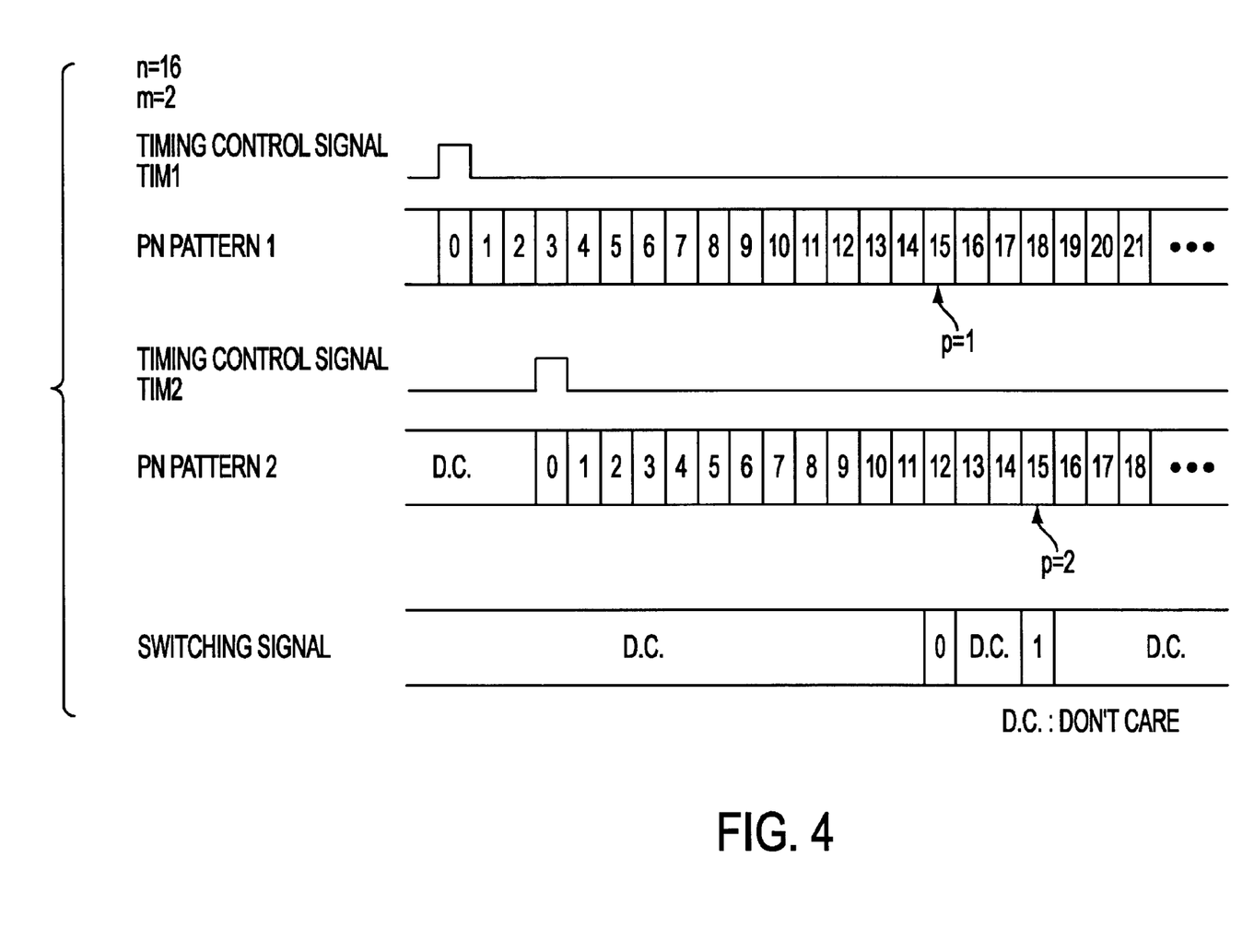
FIG. 4 depicts timing charts showing a timing operation of the correlator.

The operation of the synchronous estimator 122 for estimating the detected pre-synchronous phases is now explained with reference to FIG. 4. FIG. 4 shows a timing operation of the correlator 18 (or the correlator 19). Suppose that the number of the coefficients $k_1$–$k_n$ of the digital matched filter 101 is 16 (n=16) and the number of the timing control signals $TIM_1$–$TIM_m$ is 2 (m=2).

First, the pre-synchronous decision circuit 26 detects the pre-synchronous detecting pulse and generates the timing control signal $TIM_1$. The PN pattern generator $111_1$ then generates and provides a PN pattern 1 to the n-bit shift register $112_1$ based on a timing of the timing control signal $TIM_1$. After the PN pattern 1 is input to the n-bit shift register $112_1$, the multiplexer 113 selects and outputs to the multiplier $114_1$–$114_{16}$ the 16 bits of the PN pattern 1 at operation timing p=1 based on the switching signal from terminal 121. Simultaneously, 16 bits stored in the DFF $104_1$–$104_{16}$ are respectively provided to the multipliers $114_1$–$114_{16}$, and the correlation operation is performed at operation timing p=1. Since the number of the coefficients of the digital matched filter 101 is 16 (n=16), the correlation operation for the PN pattern 1 is repeatedly performed every operation timing p=1 (every 16 clocks). The results of the multiplications in the multipliers $114_1$–$114_{16}$ are summed in the adder 115, and the summed result is provided to the accumulator $117_1$ via the de-multiplexer 116.

Accordingly, the multiplication of each of the multipliers $114_1$–$114_{16}$, the addition of the adder 115 and the accumulation of the accumulator $117_1$–$117_{16}$ is performed every pre-synchronous phase based on the timing control signal $TIM_1$ and not every bit of the input data entered. As a result, if the number of the coefficients $k_1$–$k_n$ of the digital matched filter 101 is 16 (n=16), total operations of the correlator 18 (or correlator 19) become about one-sixteenth that of using only the digital matched filter 101. However, the correlation value performed by one correlation operation is the same accuracy as the digital matched filter 101. Since operation timing (p=1) occur every 16 clocks, the result of each correlation operation is accumulated in each of the accumulators $117_1$–$117_{16}$. Consequently, the synchronous decision circuit 27 can correctly detect a synchronous phase based on the accumulated result of the accumulators $117_1$–$117_{16}$.

Further, the pre-synchronous decision circuit 26 likewise detects the other pre-synchronous detecting pulse from PN pattern 2 and generates the timing control signal $TIM_2$, and the same correlation operations are performed as for the timing control signal $TIM_1$.

It is possible to increase the accuracy of detecting the synchronization if the number of the timing control signals $TIM_1$–$TIM_m$ is equal to the number of the coefficients $k_1$–$k_n$ of the digital matched filter 101 (m=n).

According to the synchronous detector 10 of the first embodiment, if the number of coefficients $k_1$–$k_n$, of the digital matched filter is divided by p, where p is a positive integer, the size of the synchronous detector 10 can be reduced. In addition, the accuracy of detecting synchronization is not sacrificed due to the synchronous estimator 122.

In the first embodiment, the BPSK (binary phase shift keying) modulation method is used. However, it is possible to apply QPSK (quadrature phase shift keying) modulation method by equipping four correlators in the synchronous detector 10.

The input data and operations for detecting the correlation power are described as hard decision operations. However, it is possible to perform soft decision operations.

If a complement of [1] is used as an input data of the digital matched filter 101, the multipliers $106_1$–$106_n$ and the multipliers $114_1$–$114_n$ can be replaced by exclusive OR circuits.

In the synchronous estimator 122, the de-multiplexer 116 time-division de-multiplexes the output signal of the adder 115 if to the accumulators $117_1$–$117_n$. However, the de-multiplexer 116 can be replaced by a switching element for switching the output signal of the adder 115 to the accumulator $117_1$–$117_n$ in response to a switching signal.

Although two or more timing control signals $TIM_1$–$TIM_m$ are used in this embodiment, it is possible to use a single timing control signal $TIM_1$ to detect the pre-synchronous phase without reducing the accuracy of detecting the pre-synchronous phase.

Second Embodiment of the Invention

Figure 5:
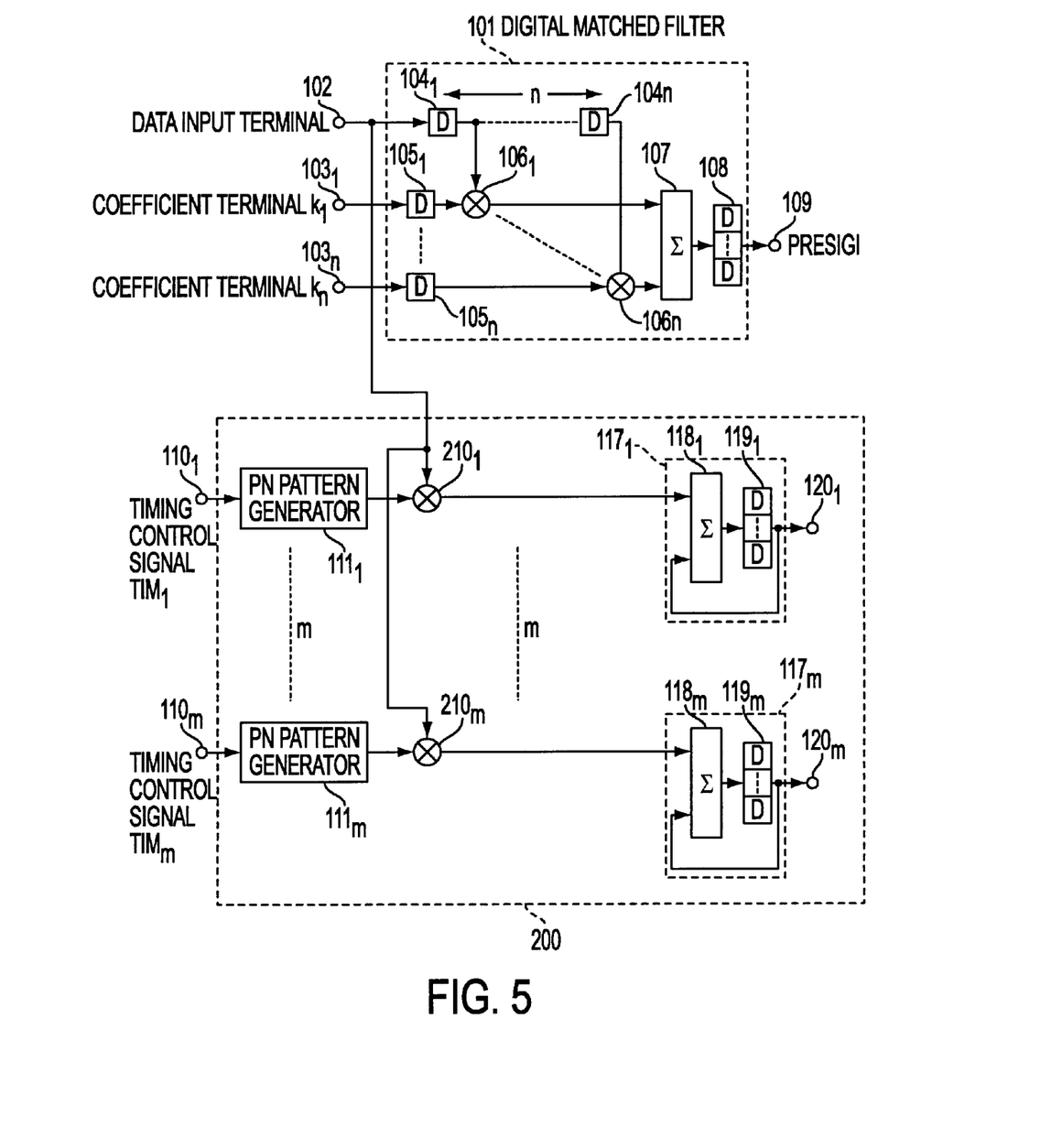
FIG. 5 is a block diagram showing a synchronous detector according to a second embodiment of the invention.

FIG. 5 shows a digital matched filter 101 and a synchronous estimator 200 according to a second embodiment of the invention. The digital matched filter 101 and the synchronous estimator 200 can implement the correlators 18 or 19 of the first embodiment.

As in the first embodiment, the digital matched filter 101 has a data input terminal 102 for receiving the baseband signal, coefficient terminals $103_1$–$103_n$, D-type flip-flops (DFF) $104_1$–$104_n$, D-type flip-flops $105_1$–$105_n$, multipliers $106_1$–$106_n$, an adder 107, a D-type flip-flop 108 and an output terminal 109.

The coefficient terminals $103_1$–$103_n$ are respectively connected to the DFFs $105_1$–$105_n$ to input coefficients $k_1$–$k_n$. The DFFs $104_1$–$104_n$ are serially connected to each other to function as a shift register, and one end of DFF 104 is connected to the data input terminal 102. The multipliers $106_1$–$106_n$ are respectively connected to the DFFs $104_1$–$104_n$ and the DFFs $105_1$–$105_n$. That is, the outputs of the DFF $104_1$ and the DFF $105_1$ are provided to the multiplier $106_1$, and the outputs of the DFF $104_2$ and the DFF $105_2$ are provided to the multiplier $106_2$. Similarly the outputs of the DFF $104_n$ and the DFF $105_n$ are provided to the multiplier $106_n$. The adder 107 sums all multiplied results of the multipliers $106_1$–$106_n$ and outputs the summed result to the DFF 108 for temporally storing the summed result Here, the coefficients $k_1$–$k_n$ are the same code sequence as the PN code sequence used by the transmitting station.

The synchronous estimator 200 is now explained. The synchronous estimator 200 has input terminals $110_1$–$110_m$, PN pattern generators $111_1$–$111_m$, multipliers $210_1$–$210_m$, accumulators $117_1$–$117_m$ and output terminals terminal $120_1$–$120_m$. The accumulators $117_1$–$117_m$ are respectively comprised of adders $118_1$–$118_m$ and registers $119_1$–$119_m$.

The timing control signals $TIM_1$–$TIM_m$ generated by the pre-synchronous decision circuit 26 are respectively input to the PN pattern generators $111_1$–$111_m$ via the input terminals $110_1$–$110_m$ to control the timing for generating PN patterns. That is, the timing control signal $TIM_1$ is input to the PN pattern generator $111_1$ via the input terminal $110_1$, and similarly the timing control signal $TIM_m$ is input to the PN pattern generator $111_m$ via the input terminal $110_m$. The PN pattern generators $111_1$–$111_m$ generate the PN patterns according to the timing control signals $TIM_1$–$TIM_m$ and then serially output the PN patterns to the multipliers $210_1$–$210_m$. The PN pattern generators $111_1$–$111_m$ have the same structure and generate the same code sequence as the PN patterns used by the transmitting station.

Each of the multipliers $210_1$–$210_m$ serially multiplies each bit of the baseband signals input to the data input terminal 102 with each bit of PN pattern generated by the PN pattern generators $111_1$–$111_m$ and outputs a serial data to the accumulators $117_1$–$117_m$.

The accumulators $117_1$–$117_m$ are individually composed of the adders $118_1$–$118_m$ and the registers $119_1$–$119_m$. Each of the registers $119_1$–$119_m$ has the sufficient number of registers to avoid over-flow. The serial data of the multipliers $210_1$–$210_m$ are provided to the input terminals of the adders $118_1$–$118_m$, respectively, and the outputs of the adders $118_1$–$118_m$ are provided to the registers $119_1$–$119_m$, respectively. The outputs of registers $119_1$–$119_m$ are provided to the other input terminals of the adders $118_1$–$118_m$, respectively.

The accumulators $117_1$–$117_m$ respectively accumulate n outputs of the multipliers $210_1$–$210_m$, and output the correlation values ($SIGI_1$–$SIGI_m$) to the squaring circuit 22 shown in FIG. 1 via the output terminals $120_1$–$120_m$.

Here, the number of the input terminals $110_1$–$110_m$, the PN pattern generators $111_1$–$111_m$, the multipliers $210_1$–$210_m$, accumulators $117_1$–$117_m$ and the output terminals terminal $120_1$–$120_m$ correspond to the number m (where m is a positive integer) of the timing control signals $TIM_1$–$TIM_m$.

As mentioned above, the synchronous estimator 200 performs serial operations at the input terminals $110_1$–$110_m$, the PN pattern generators $111_1$–$111_m$, the multipliers $210_1$–$210_m$, the accumulators $117_1$–$117_m$ and the output terminals $120_1$–$120_m$ except for the parallel connections between the data input terminal 102 and the multipliers $210_1$–$210_m$.

The difference in the operation of the synchronous estimator 200 and synchronous estimator 122 of the first embodiment of the invention is explained next.

The pre-synchronous decision circuit 26 detects the pre-synchronous detecting pulse and generates the timing control signal $TIM_1$. The PN pattern generator $111_1$ generates and provides a PN pattern to one input terminal of the multiplier $210_1$ based on the timing of the timing control signal $TIM_1$. Also the baseband signal input to the data input terminal 102 is provided to the other input terminal of the multiplier $210_1$. The timing of the timing control signal $TIM_1$ is phase-shifted such that when detecting the pre-synchronous phase by the digital matched filter 101, the phase relationship between the baseband signal and the coefficients $k_1$–$k_n$ (PN pattern sequence) matches the phase relationship between the baseband signal and PN pattern generated by the PN pattern generator $111_1$. That is, the multiplier $210_1$ serially multiplies the baseband signal with the PN pattern every clock period at the timing of pre-synchronous phase detected by the digital matched filter 101. The output of the multiplier $210_1$, is provided to the accumulator $117_1$ and is accumulated in the accumulator $117_1$, every clock period.

Similarly, if the pre-synchronous decision circuit 26 detects pre-synchronous detecting pulses and generates the timing control signals $TIM_2$–$TIM_m$, each of the multiplier $210_2$–$210_m$ multiplies the baseband signal with the PN pattern based on each of the timing control signals $TIM_2$–$TIM_m$. The accumulators $118_2$–$118_m$ also respectively accumulate each output of the multipliers $210_2$–$210_m$.

Here, it is possible for the accumulators $118_2$–$118_m$, to accumulate the output of the multiplier $210_2$–$210_m$ until resetting at a desired timing. For example, if the accumulators $118_2$–$118_m$ are reset every 1600 clock periods, the accuracy of detecting synchronization in the second embodiment is the same as that of the first embodiment.

The synchronous estimator 200 is smaller than the synchronous estimator 122 of the first embodiment if the difference between the number of the timing control signals $TIM_1$–$TIM_m$ and the number of the coefficients of the digital matched filter 101 becomes large (i.e., m<n).

In the second embodiment, BPSK modulation has been used. However, it is possible to apply QPSK modulation by providing four correlators in the synchronous detector 10.

Also, the input data and operations for detecting the correlation power are described as hard decision operations. However, it is possible to perform soft decision operations.

Further, if a complement of [1] is used as the input data of the digital matched filter 101, the multipliers $106_1$–$106_n$ and the multipliers $210_1$–$210_n$ can be replaced with exclusive OR circuits.

Although two or more timing control signals $TIM_1$–$TIM_m$ are used in this embodiment, it is possible to use one timing control signal $TIM_1$ to detect the pre-synchronous phase without reducing the accuracy of detecting the pre-synchronous phase.

There are m PN pattern generators $111_1$–$111_m$ in response to the m timing control signals $TIM_1$–$TIM_m$ in the second embodiment. However, it is possible to use one PN pattern generator by shifting the phase of the PN pattern based on the m timing control signals $TIM_1$–$TIM_m$ in order to generate m types of PN patterns.

Third Embodiment of the Invention

Figure 6:
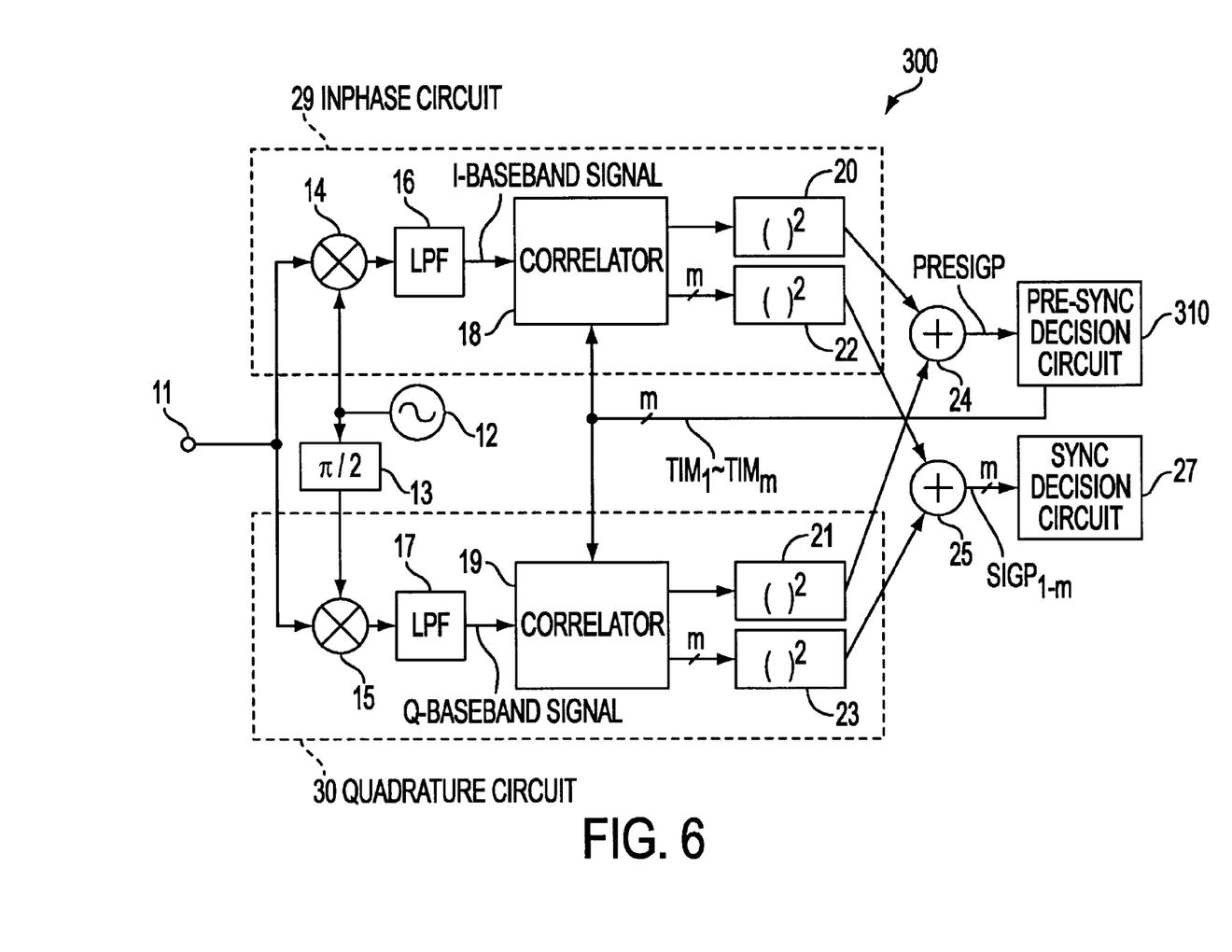
FIG. 6 is a block diagram showing a synchronous detector according to a third embodiment of the invention.

FIG. 6 shows a synchronous detector 300 according to a third embodiment of the invention. The synchronous detector 300 includes an input terminal 11, a carrier oscillator 12, a π/2 phase shifter 13, frequency mixers 14 and 15, low pass filters 16 and 17, correlators 18 and 19, squaring circuits 20, 21, 22 and 23, adders 24 and 25, a pre-synchronous decision circuit 310 and a synchronous decision circuit 27.

The third embodiment is different from the first embodiment in that the pre-synchronous decision circuit 310 is not connected to the synchronous decision circuit 27 and the threshold input terminal 28 is not used. Accordingly, the pre-synchronous decision circuit 310 includes a comparator 400 and a timing control signal generator 500 as explained below.

Figure 7:
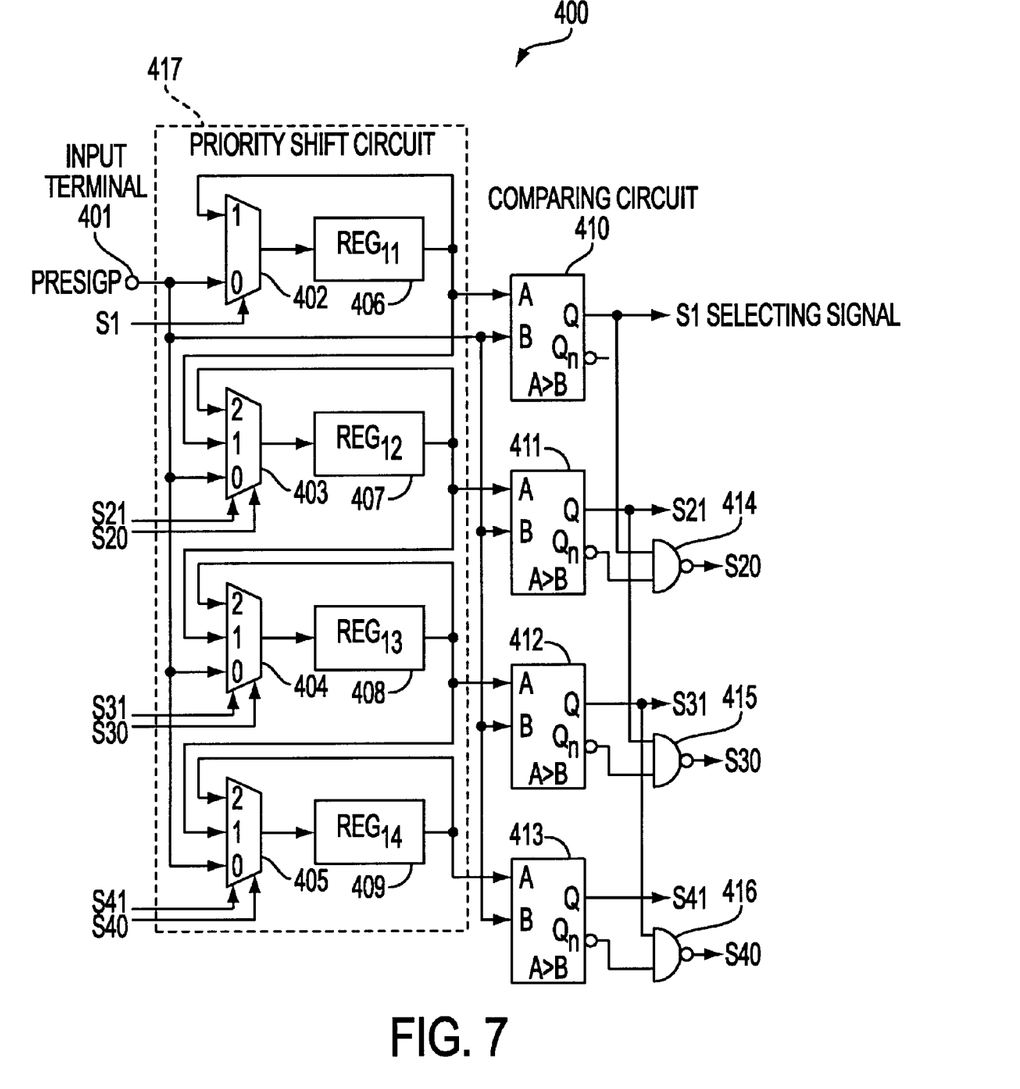
FIG. 7 is a block diagram showing a comparator of the pre-synchronous decision circuit.
Figure 8:
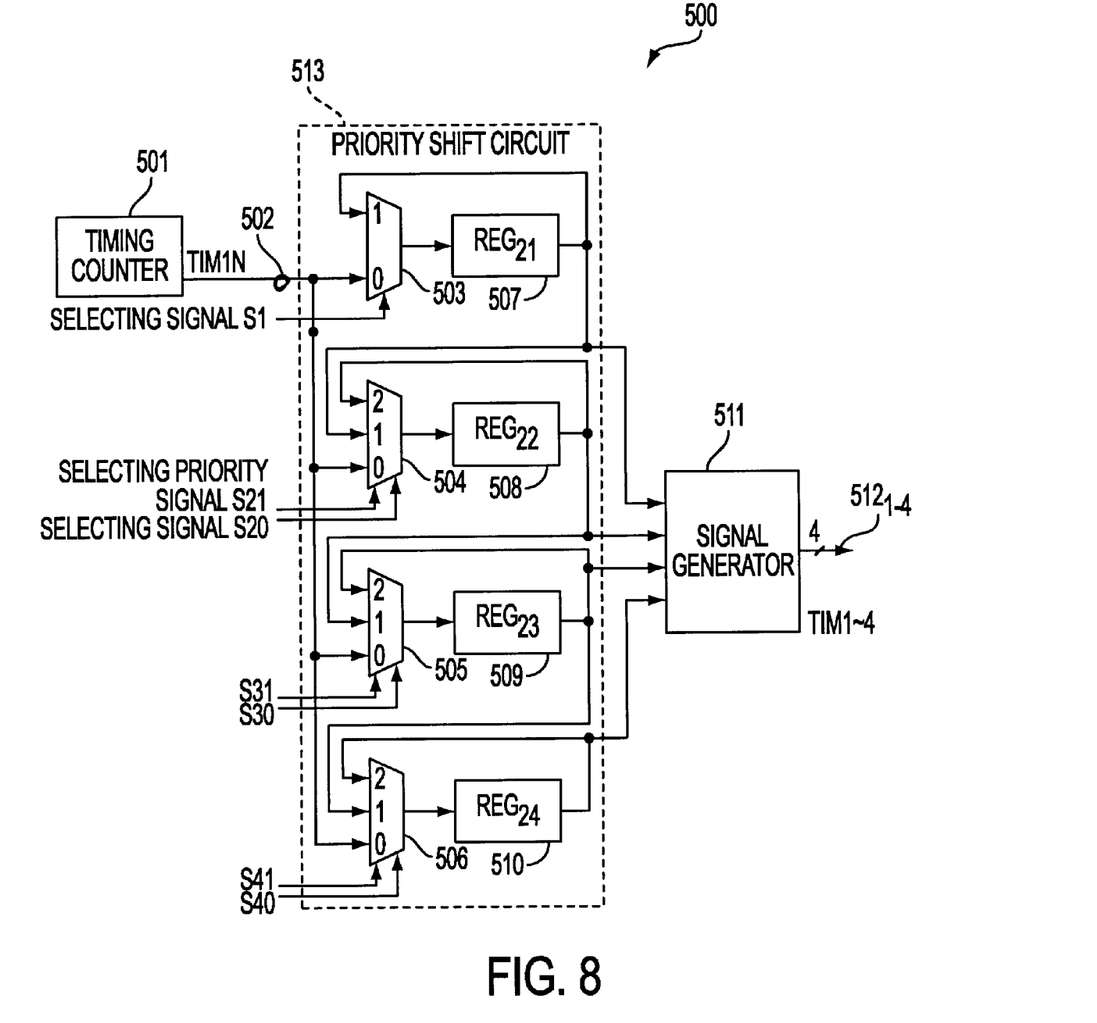
FIG. 8 is a block diagram showing a timing control signal generator of the pre-synchronous decision circuit.

FIG. 7 shows the comparator 400 of the pre-synchronous decision circuit 310, and FIG. 8 shows the timing control signal generator 500 of the pre-synchronous decision circuit 310. In this embodiment, assume that the number of timing control signals $TIM_1$–$TIM_m$ is 4 (m=4).

In FIG. 7, the comparator 400 has an input terminal 401, selectors 402, 403, 404 and 405, registers 406, 407, 408 and 409, comparing circuits 410, 411, 412 and 413 and NAND circuits 414, 415 and 416. A priority shift circuit 417 is composed of the selectors 402, 403, 404 and 405 and the registers 406, 407, 408 and 409.

The input terminal 401 receives the pre-correlation power signal PRESIGP output by the adder 24 shown in FIG. 6, and the pre-correlation power signal PRESIGP is provided to terminal-0 of the selectors 402, 403, 404 and 405.

An output of the selector 402 is provided to the register 406, and an output of the register 406 is fed back to a terminal-1 of the selector 402. The output of the register 406 is also provided to a terminal-A of the comparing circuit 410 and provided to a terminal-1 of the selector 403. An output-Q of the comparing circuit 410 is provided to the selector 402 and provided to the selector 503 of the timing control signal generator 500 shown in FIG. 8 (explained below) as the selecting signal S1.

An output of the selector 403 is provided to the register 407, and an output of the register 407 is fed back to a terminal-2 of the selector 403. The output of the register 407 is also provided to a terminal-A of the comparing circuit 411 and provided to a terminal-1 of the selector 404. An output-Q of the comparing circuit 411 is provided to the selector 403 and the selector 504 of the timing control signal generator 500 shown in FIG. 8 (explained below) as the selecting priority signal S21. Also, a negative logical output-Qn, which is the negative logic of the output of the output-Q, and selecting signal S1 are provided to a NAND circuit 414. The output of the NAND circuit 414 is provided to the selector 403 and the selector 504 of the timing control signal generator 500 shown in FIG. 8 as the selecting signal S20.

Here, if the selecting priority signal S21 is logical [1], an input signal provided to the terminal-2 of the selector 504 is output to the register 508. Also, if the selecting priority signal S21 is logical [0] and the selecting signal S20 is logical [1], an input signal provided to the terminal-1 of the selector 504 is output to the register 508. If the selecting priority signal S21 is logical [0] and the selecting signal S20 is logical [0], an input signal provided to the terminal-0 of the selector 504 is output to the register 508.

An output of the selector 404 is provided to the register 408, and an output of the register 408 is fed back to a terminal-2 of the selector 404. The output of the register 408 is also provided to a terminal-A of the comparing circuit 412 and a terminal-1 of the selector 405. An output-Q of the comparing circuit 412 is provided to the selector 404 and the selector 505 of the timing control signal generator 500 shown in FIG. 8 as a selecting priority signal S31. Also, a negative logical output-Qn, which is the negative logic of the output of the output Q, and selecting priority signal S21 are provided to the NAND circuit 415. The output of a NAND circuit 415 is provided to the selector 404 and the selector 505 of the timing control signal generator 500 shown in FIG. 8 as a selecting signal S30.

An output of the selector 405 is provided to the register 409, and an output of the register 409 is fed back to a terminal-2 of the selector 405. The output of the register 409 is also provided to a terminal-A of the comparing circuit 413. An output-Q of the comparing circuit 413 is provided to the selector 405 and the selector 506 of the timing control signal generator 500 shown in FIG. 8 as a selecting priority signal S41. Also, a negative logical output-Qn, which is the negative logic of the output of the output-Q, and selecting priority signal S31 are provided to a NAND circuit 416. The output of the NAND circuit 416 is provided to the selector 405 and the selector 506 of the timing control signal generator 500 shown in FIG. 8 as a selecting signal S40.

In FIG. 8, the timing control signal generator 500 includes a timing counter 501, an output terminal 502, selectors 503, 504, 505 and 506, registers 507, 508, 509 and 510, a signal generator 511, output terminals $512_1$–$512_4$. A priority shift circuit 513 is composed of the selectors 503, 504, 505 and 506 and the registers 507, 508, 509 and 510. The priority shift circuit 513 has the same configuration as the priority shift circuit 417 shown in FIG. 7.

The timing counter 501 is reset at the beginning of the synchronization and counts every clock timing period. The output of the timing counter 501 is provided to terminals-0 of the selectors 503, 504, 505 and 506 via the output terminal 502 as a count signal TIMIN.

The output of the selector 503 is provided to the register 507, and the output of the register 507 is fed back to the terminal-1 of the selector 503. Also, the output of the register 507 is provided to the terminal-1 of the selector 504 and the signal generator 511.

The output of the selector 504 is provided to the register 508, and the output of the register 508 is fed back to the terminal-2 of the selector 504. Also, the output of the register 508 is provided to the terminal-1 of the selector 505 and the signal generator 511.

The output of the selector 505 is provided to the register 509, and the output of the register 509 is fed back to the terminal-2 of the selector 505. Also, the output of the register 509 is provided to the terminal-1 of the selector 506 and the signal generator 511.

The output of the selector 506 is provided to the register 510, and the output of the register 510 is fed back to the terminal-2 of the selector 506. Also, the output of the register 510 is provided to the signal generator 511.

The signal generator 511 comprises counters to count the outputs of the registers 507, 508, 509 and 510 and logic circuits to output pulses. The signal generator 511 generates timing control signals $TIM_1$–$TIM_4$ based on the outputs of the registers 507, 508, 509 and 510.

The operation of the synchronous detector 300 will now be explained with reference to FIGS. 7 and 8.

First, in the comparator 400 and the timing signal generator 500, each of the registers 406, 407, 408, 409, 507, 508, 509, and 510 and the timing counter 501 are reset when beginning detection of the synchronization. Next, the pre-correlation power signal PRESIGP output by the adder 24 is provided to each terminal-B of the comparing circuits 410, 411, 412 and 413, and the outputs of the registers 406, 407, 408 and 409, respectively, are provided to the terminal-A of the comparing circuits 410, 411, 412 and 413. That is, the comparing circuit 410 compares the pre-correlation power signal PRESIGP with the output of the register 406. Similarly, the comparing circuits 411, 412 and 413 compare the pre-correlation power signal PRESIGP with each output of the registers 407, 408 and 409, respectively. Thus, each of the comparing circuits 410, 411, 412 and 413 outputs logical value [1] if the output of each of the registers 406, 407, 408 and 409, respectively, is larger than the pre-correlation power signal PRESIGP, and outputs logical value [0] otherwise.

When a first pre-correlation power signal PRESIGP having a particular value larger than 0 is provided to each terminal-B of the comparing circuits 410, 411, 412 and 413, the outputs (S1, S21, S31 and S41) of the comparing circuits 410, 411, 412 and 413 all become logical [0] because each of the registers 406, 407, 408 and 409 has an initial value [0] due to the reset. At this time, the outputs S20, S30 and S40 all become logical [1]. Accordingly, the selector 402 outputs the first pre-correlation power signal PRESIGP based on the output S1 (=0), and the register 406 stores the first pre-correlation power signal PRESIGP. The selector 403 outputs the output of the register 406 based on the output S21 (=0) and the output S20 (=1), and the register 407 stores the output of the register 406. The selector 404 outputs the output of the register 407 based on the output S31 (=0) and the output S30 (=1), and the register 408 stores the output of the register 407. The selector 405 outputs the output of the register 408 based on the output S41 (=0) and the output S40 (=1), and the register 409 stores the output of the register 408.

Further, in the timing control signal generator 500 shown in FIG. 8, the selector 503 outputs the first count signal TIMIN based on the output signal S1 (=0), and the register 507 stores the output of the selector 503. The selector 504 outputs the output of the register 507 based on the output S21 (=0) and the output S20 (=1), and the register 508 stores the output of the register 507. The selector 505 outputs the output of the register 508 based on the output S31 (=0) and the output S30 (=1), and the register 509 stores the output of the register 508. The selector 506 outputs the output of the register 509 based on the output S41 (=0) and the output S40 (=1), and the register 510 stores the output of the register 509.

Next, if a second pre-correlation power signal PRESIGP in which is larger than 0 and smaller than the first pre-correlation power signal PRESIGP (i.e., first PRESIGP>second PRESIGP>0) is provided to each terminal-B of the comparing circuits 410, 411, 412 and 413, the output S1 of the comparing circuit 410 becomes logical [1], and the outputs S21, S31 and S41 of the comparing circuits 411, 412 and 413 all become Of logical [0]. At this time, the output S20 becomes [0], and the outputs S30 and S40 become [1]. Accordingly, the selector 402 outputs the output of the register 406 based on the output S1 (=1), and the register 406 repeatedly stores the first pre-correlation power signal PRESIGP. The selector 403 outputs the second pre-correlation power signal PRESIGP based on the output S21 (=0) and the output S20 (=0), and the register 407 stores the second pre-correlation power signal PRESIGP. The selector 404 outputs the output of the register 407 based on the output S31 (=0) and the output S30 (=1), and the register 408 stores the output of the register 407. The selector 405 outputs the output of the register 408 based on the output S41 (=0) and the output S40 (=1), and the register 409 stores the output of the register 408.

Further, the selector 503 shown in FIG. 8 outputs the first count signal TIMIN based on the output signal S1 (=1), and the register 507 repeatedly stores the output of the register 507. The selector 504 outputs the second count signal TIMIN based on the output S21 (=0) and the output S20 (=0), and the register 508 stores the second count signal TIMIN. The selector 505 outputs the output of the register 508 based on the output S31 (=0) and the output S30 (=1), and the register 509 stores the output of the register 508. The selector 506 outputs the output of the register 509 based on the output S41 (=0) and the output S40 (=1), and the register 510 stores the output of the register 509.

As mentioned above, the outputs S1, S20, S21, S30, S31, S40 and S41 are generated such that the register 406 stores the largest pre-correlation power signal PRESIGP and the register 409 stores the smallest pre-correlation power signal PRESIGP (register 406 >register 407 >register 408 >register 409). As a result, each of the register 406, 407, 408 and 409 stores a new pre-correlation power signal PRESIGP if the new pre-correlation power signal PRESIGP is larger than the stored pre-correlation power signal PRESIGP in the register 406, and the stored pre-correlation power signals PRESIGP in the registers 406, 407 and 408 are respectively cascaded to the lower registers 407, 408 and 409.

If the new pre-correlation power signal PRESIGP is smaller than the stored pre-correlation power signal PRESIGP in the register 406 but larger than the stored pre-correlation power signal PRTSIGP in the register 407, the new pre-correlation power signal PRESIGP is stored in the register 407, and the stored pre-correlation power signals PRESIGP in the registers 407 and 408 are respectively cascaded to the register 408 and 409.

If the new pre-correlation power signal PRESIGP is smaller than the stored pre-correlation power signal PRESIGP in the register 407 but larger than the stored pre-correlation power signal PRESIGP in the register 408, the new pre-correlation power signal PRESIGP is stored in the register 408, and the stored pre-correlation power signals PRESIGP in the registers 408 is cascaded to the register 409.

If the new pre-correlation power signal PRESIGP is smaller than the stored pre-correlation power signal PRESIGP in the register 408 but larger than the stored pre-correlation power signal PRESIGP in the register 409, the new pre-correlation power signal PRESIGP is stored in the register 409.

Similarly, the registers 507, 508, 509 and 510 likewise store the count signals TIMIN corresponding to the pre-correlation power signals respectively stored in the registers 406, 407, 408 and 409.

Consequently, when this operation of detecting pre-synchronization is performed during a predetermined period, for example, of a cycle of a series of a PN pattern or a frame length of the data frame, the largest pre-correlation power signal PRESIGP is stored in the register 406, and the corresponding count signal TIMIN is stored in the register 507 as timing information for the timing control signals $TIM_1$–$TIM_4$.

Since the timing information corresponds to the phase information of the pre-synchronous detecting pulse discussed in the first embodiment, it is possible for the signal generator 511 to generate the timing control signals $TIM_1$–$TIM_4$ by counters and logical circuits.

The timing control signals $TIM_1$–$TIM_4$ generated by the signal generator 511 is provided to the correlators 18 and 19 in FIG. 6. The correlators 18 and 19 respectively generate the correlation results ($SIGI_1$–$SIGI_4$) and ($SIGQ_1$–$SIGQ_4$) corresponding to the timing control signals $TIM_1$–$TIM_4$ as mentioned in the first embodiment. In addition, since the registers 507, 508, 509 and 510 store the count signal TIMIN in the order of the pre-correlation power signals stored in registers 406, 407, 408 and 409, the pre-synchronous decision circuit 310 effectively generates the timing control signals $TIM_1$. Also, the pre-synchronous decision circuit 310 generates the timing control signals $TIM_1$–$TIM_4$ without needing a threshold Th estimated by simulation or field test as in the first embodiment. Consequently, the synchronous detector 300 with the pre-synchronous decision circuit 310 can flexibly be adapted to varying conditions in a radio communication system.

In the third embodiment, the number of the timing control signals has been described as 4, however, it is possible to select any number of timing control signals to correspond to the accuracy of the detection of the synchronization and the conditions of the radio communication system.

Although the embodiments of the invention have been discussed as being implemented with certain circuitry, the invention can be implemented with other circuitry, hardware, software, or a combination of hardware and software as those skilled in the art will recognize.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A synchronous detector used in a code division multiple access communication receiver comprising:

a correlator for calculating a plurality of correlation values between a received signal spread with an x-chip sequence of a spread code and a first n-chip correlation coefficient for different phase timings, where x and n are positive integers and n is smaller than x, said correlator comprising a synchronous estimator for estimating a synchronous phase by calculating the correlation values between the received signal and the first n-chip correlation coefficients every cycle of the spread code and by accumulating the correlation values, said synchronous estimator comprising:

a plurality of second n-chip correlation coefficient generators for generating second n-chip correlation coefficients at a phase timing indicated by timing control signals;

a multiplexer for multiplexing the second n-chip correlation coefficients generated by the plurality of second n-chip correlation coefficient generators to obtain an n-chip multiplexed signal;

n multipliers for multiplying the n-chip multiplexed signal and the received signal at the phase timing indicated by each of the timing control signals to obtain a multiplication signal;

a demultiplexer for demultiplexing the multiplication signal to obtain an n-chip demultiplexed signal; and m accumulators for accumulating the n-chip demultiplexed signal; and a pre-synchronous decision circuit, coupled to said correlator, for generating at least one timing control signal indicating the phase timing corresponding to a highest correlation value.

2. A synchronous detector used in a code division multiple access communication receiver comprising:

a correlator for calculating a plurality of correlation values between a received signal spread with an x-chip sequence of a spread code and a first n-chip correlation coefficient for different phase timings, where x and n are positive integers and n is smaller than x, said correlator comprising a synchronous estimator for estimating a synchronous phase by calculating the correlation values between the received signal and the first n-chip correlation coefficients every cycle of the spread code and by accumulating the correlation values, said synchronous estimator comprising a second n-chip correlation coefficient generator for generating a second n-chip correlation coefficient at a phase timing indicated by a timing control signal; and a pre-synchronous decision circuit, coupled to said correlator, for generating at least one timing control signal indicating the phase timing corresponding to a highest correlation value, said pre-synchronous decision circuit comprising:

(a) a comparator comprising:

a plurality of cascaded first registers for storing the correlation values calculated by said correlator;

a plurality of comparing circuits, each comparing circuit being connected to one of said first registers, each comparing circuit comparing the correlation value stored in the connected first register with a next correlation value and generating a selecting signal when the next correlation value exceeds the correlation value stored in the connected first register; and a plurality of first selectors, each first selector connected to one of said first registers, each first selector providing the next correlation value to the connected first registers, said first selectors cascading next correlation values through the cascaded first registers; and (b) a timing control signal generator comprising:

a plurality of cascaded second registers for storing timing information corresponding to the correlation values stored in the first registers; and a plurality of second selectors, each second selector connected to one of said second registers, each second selector providing the next timing information to the connected second register, said second selectors cascading next timing information through the cascaded second registers.

3. A synchronous detecting method used in a code division multiple access communication receiver comprising the steps of:

(a) calculating a plurality of correlation values between a received signal spread with an x-chip sequence of a spread code and n-chip correlation coefficients for different phase timings, where x and n are positive integers and n is smaller than x;

(b) generating at least one timing control signal indicating a phase timing corresponding to a highest correlation value, the generation of said at least one timing control signal comprising the sub-steps of:

(b1) storing a correlation value in a first register;

(b2) comparing the stored correlation value with a next correlation value;

(b3) generating a first selecting signal when the next correlation value exceeds the stored correlation value; and (b4) storing the correlation value and the next correlation value in a cascaded manner;

(b5) storing timing information corresponding to the correlation value;

(b6) comparing the stored timing information with next timing information;

(b7) generating a second selecting signal when the next timing information exceeds the stored timing information; and (b8) storing the timing information and the next timing information in the cascaded manner; and (c) generating the n-chip correlation coefficients at a phase timing indicated by the at least one timing control signal; and (d) estimating a synchronous phase by calculating the correlation values between the received signal and the n-chip correlation coefficients every cycle of the spread code and by accumulating the correlation values.

4. A synchronous detector used in a code division multiple access communication receiver comprising:

a correlator for calculating a plurality of correlation values between a received signal spread with an x-chip sequence of a spread code and a first n-chip correlation coefficient for different phase timings, where x and n are positive integers and n is smaller than x, said correlator comprising a synchronous estimator for estimating a synchronous phase by calculating the correlation values between the received signal and the first n-chip correlation coefficients every cycle of the spread code and by accumulating the correlation values, said synchronous estimator comprising a second n-chip correlation coefficient generator for generating a second n-chip correlation coefficient at a phase timing indicated by a timing control signal; and a pre-synchronous decision circuit, coupled to said correlator, for generating at least one timing control signal indicating the phase timing corresponding to a highest correlation value, said pre-synchronous decision circuit including:

(a) a comparator comprising:

a plurality of cascaded first registers for storing the correlation values calculated by said correlator, each of said first registers having an output;

a plurality of comparing circuits, each of said comparing circuits having a first input connected to the output of an associated one of said first registers and a second input for receiving the correlation values calculated by said correlator, each of said comparing circuits comparing the correlation value stored in an associated first register with a next correlation value and generating a selecting signal when the next correlation value exceeds the correlation value stored in the associated first register; and a plurality of first selectors, each of said first selectors being connected to an associated register and receiving a selecting signal from an associated first comparing circuit, each first selector providing the next correlation value to the associated first registers and cascading next correlation values through the cascaded first registers; and (b) a timing control signal generator including:

a plurality of cascaded second registers for storing timing information corresponding to the correlation values stored in the first registers; and a plurality of second selectors, each of said second selectors being connected to an associated one of said second registers and receiving a selecting signal from an associated comparing circuit, each second selector providing the next timing information to the connected second register and cascading next timing information through the cascaded second registers.

* * * * *